(12) United States Patent
Hirose

(10) Patent No.: US 6,483,984 B1
(45) Date of Patent: Nov. 19, 2002

(54) MAGNETIC RECORDING-REPRODUCTION DEVICE

(75) Inventor: Yoshiki Hirose, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/280,012

(22) Filed: Mar. 29, 1999

(30) Foreign Application Priority Data

Mar. 31, 1998 (JP) ............................................. 10-086408

(51) Int. Cl.[7] ............................. H04N 5/76; H04N 5/92
(52) U.S. Cl. ............................. 386/46; 386/57; 386/79; 386/95; 360/69; 360/72.2
(58) Field of Search ................................. 386/1, 46, 57, 386/95, 78–79, 59, 62; 360/51, 55, 69, 71, 72.1, 72.2, 72.3, 73.12, 73.13, 27; H04N 5/76, 5/92, 9/79

(56) References Cited

U.S. PATENT DOCUMENTS 5,793,925 A * 8/1998 Sakakibara et al. ........... 386/57
5,907,446 A * 5/1999 Ishii et al. .................. 360/72.2
6,141,171 A * 10/2000 Taniguchi ................... 360/72.1
6,370,313 B2 * 4/2002 Link et al. .................... 386/57

* cited by examiner

Primary Examiner—Thai Tran
(74) Attorney, Agent, or Firm—Armstrong, Westerman & Hattori, LLP

(57) ABSTRACT

The invention provides a magnetic recording-reproduction device which comprises a CTL signal recording circuit 5 for recording a control signal, a CTL duty setting circuit 4 for setting a variable duty ratio for the control signal, a CTL signal reproduction circuit 6 for reproducing the control signal, a CTL duty identification circuit 7 for identifying the duty ratio of the reproduced control signal, and a system control circuit 8 for controlling the operation of the device. The system control circuit 8 decodes magnetic tape management information superposed on the control signal based on the result of identifying the duty ratio by the identification circuit 7 when a command is given to record video signals, and controls validation/invalidation of the command according to the result of decoding.

5 Claims, 4 Drawing Sheets

MAGNETIC RECORDING-REPRODUCTION DEVICE

FIELD OF THE INVENTION

The present invention relates to magnetic recording-reproduction devices, such as VCRs (video cassette recorders), wherein the tape speed and phase can be controlled for the reproduction of video signals by recording a control signal on the control track of the magnetic tape.

BACKGROUND OF THE INVENTION

The so-called time lapse VCR is already known as a signal recording device for use as connected to a monitoring camera installed in a store or the like for security purposes. It is sometimes compulsory to set a specified preservation period for the magnetic tape having video signals recorded thereon by the time lapse VCR. Due to a careless error in the management of magnetic tapes, however, it is likely that video signals will be recorded anew on the magnetic tape of which the specified preservation period has not elapsed. Accordingly, a magnetic tape management method is known wherein tape management data such as the time and date of recording is recorded as superposed on the video signal during a vertical blanking period of the video signal and read from the tape when video signals are to be recorded.

However, this method requires an integrated circuit specifically for superposing the data on the recorded video signal and reading the data from the reproduced video signal, hence the problem of necessitating an increased circuit board area and an increase in the number of assembling steps.

SUMMARY OF THE INVENTION

Accordingly, an object of the present invention is to provide a magnetic recording-reproduction device which is adapted for the management of magnetic tapes without incorporating a specific integrated circuit conventionally needed.

The present invention provides a magnetic recording-reproduction device which comprises a CTL signal recording circuit 5 for recording a control signal on a magnetic tape, a CTL duty setting circuit 4 for setting a variable duty ratio for the control signal, a CTL signal reproduction circuit 6 for reproducing the control signal recorded on the magnetic tape, a CTL duty identification circuit 7 for identifying the duty ratio of the reproduced control signal, and a system control circuit 8 for controlling the operation of the device.

The system control circuit 8 comprises: first control means for decoding magnetic tape management information superposed on the control signal based on the result of identifying the duty ratio by the CTL duty identification circuit 7 when a command is given to record video signals and controlling validation/invalidation of the command according to the result of decoding, and second control means for commanding the CTL duty setting circuit 4 to vary the duty ratio to superpose magnetic tape management information on the control signal when video signals are to be recorded.

When a command is given to record video signals, playback of the control track is started at a specified location on the magnetic tape 1, and the CTL signal reproduction circuit 6 and the CTL duty identification circuit 7 operate to identify the duty ratio of the control signal reproduced from the control track. The magnetic tape management information superposed on the control signal is decoded based on the result of identifying the duty ratio, and the validation/invalidation of the command is controlled according to the result of decoding. Information as to the date when video signals were recorded on the magnetic tape can be included in the tape management information.

The first control means of the system control circuit 8 is accordingly capable of checking whether the decoded date indicates that a specified period has not elapsed, and invalidates the command for recording when the specified period has not elapsed. This obviates the likelihood that video signals will be recorded anew on the magnetic tape of which the specified preservation period has not elapsed.

Information as to the number of times video signals were recorded on the magnetic tape can be included in the magnetic tape management information. This enables the first control means of the system control circuit 8 to check whether the decoded number of times is in excess of a specified number of times. If the specified number of times has been exceeded, the second control means invalidates the command for recording. This eliminates the likelihood that video signals will be recorded anew on an old tape which is in excess of the specified number of times video signals were recorded.

According to a specific embodiment, the second control means of the system control circuit 8 issues a command to give an altered duty ratio to the control signal to be recorded in the vicinity of the starting point of the magnetic tape. If the tape is played back in the vicinity of the starting point in this case, the tape management information can be read from the tape at all time.

Further according to another specific embodiment, the second control means of the system control circuit 8 issues a command to give an altered duty ratio to the control signal to be recorded over the entire length of the control track of the magnetic tape, at a predetermined interval along the control track. The latest tape management information can then be read from a desired location on the magnetic tape even if it is an intermediate portion of the tape.

The CTL duty setting circuit 4, CTL signal recording circuit 5, CTL signal reproduction circuit 6 and CTL duty identification circuit 7 described are incorporated also in conventional VCRs, for example, for locating the start of a recorded sequence, so that the device of the invention can be provided merely by adding the functions (software) of the first control means and the second control means to the conventional system control circuit.

The magnetic recording-reproduction device of the present invention has a simple construction for effecting magnetic tape management without using a specific integrated circuit conventionally needed.

DETAILED DESCRIPTION OF EMBODIMENTS

A time lapse VCR embodying the invention will be described below in detail with reference to the drawings.

Figure 1:
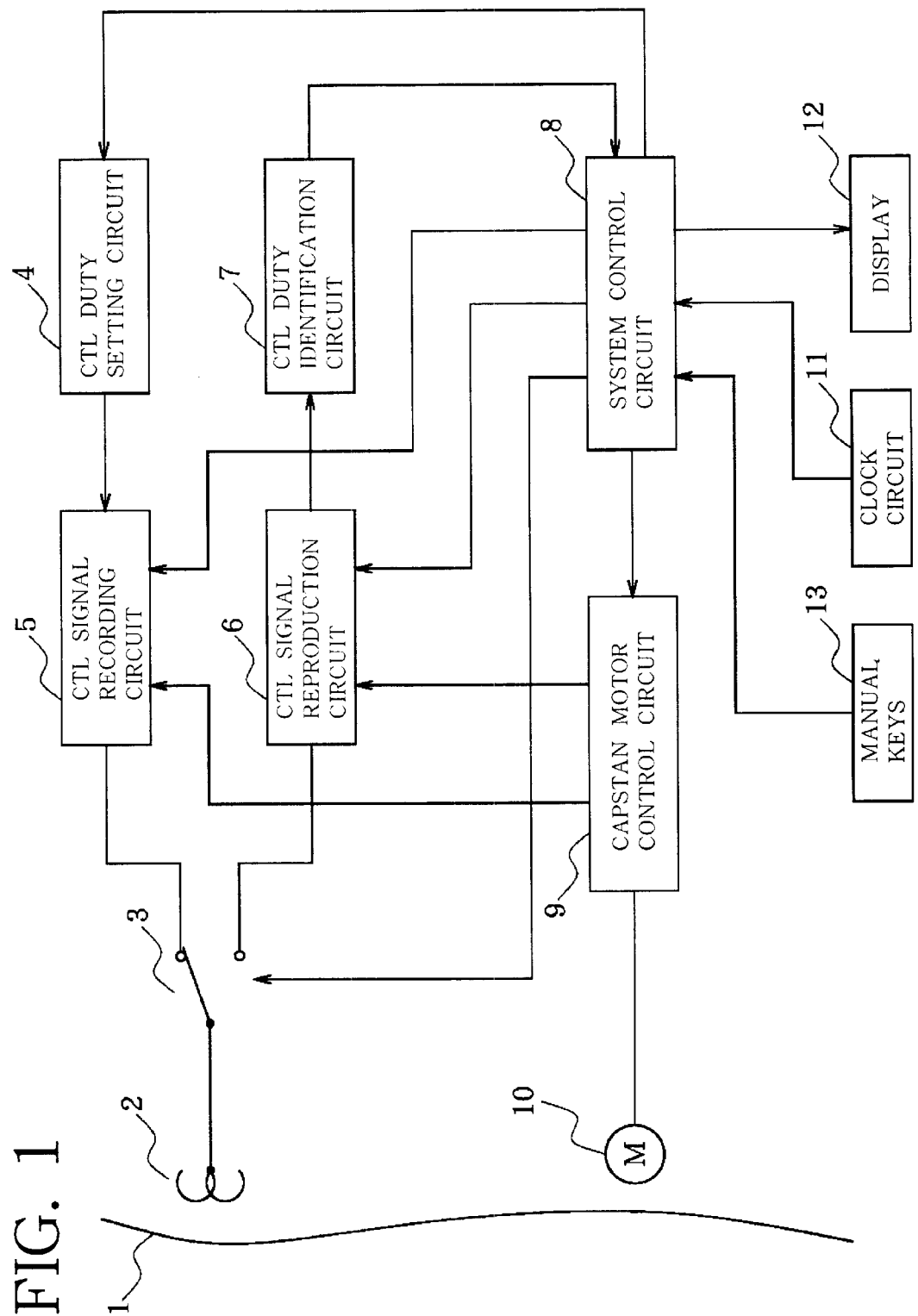
FIG. 1 is a block diagram showing the main construction of a VCR embodying the invention.

As shown in FIG. 1, the VCR comprises a control head 2 adapted for sliding contact with the control track of a magnetic tape 1, a capstan motor 10 coupled to a capstan (not shown) for running the tape 1, a capstan motor control circuit 9 for controlling the capstan motor 10, a CTL signal recording circuit 5 for effecting processing to record a control signal on the tape 1, a CTL duty setting circuit 4 for variably setting the duty ratio of the control signal, a CTL signal reproduction circuit 6 for effecting amplification, waveform shaping, etc. as required for reproducing the control signal recorded on the tape, a CTL duty identification circuit 7 for identifying the duty ratio of the reproduced control signal, a change-over switch 3 for connecting one of the CTL signal recording circuit 5 or CTL signal reproduction circuit 6 to the control head 2, and a system control circuit 8 for controlling the operation of the device.

Connected to the system control circuit 8 are a clock circuit 11 for generating the current date and time, a display 12 for showing various items of information to the user, and manual keys 13 for commanding video recording, reproduction, etc.

When a command is given to record video signals by manipulating the manual key 13 concerned, the system control circuit 8 operates the capstan motor control circuit 9 to run the magnetic tape 1 in a signal reproduction direction, while actuating the switch 3 for connection to the CTL signal reproduction circuit 6 and operating the circuit 6 and the CTL duty identification circuit 7, whereby the control signal recorded on the control track of the tape 1 is reproduced, and the duty ratio of the signal is identified. When the control signal has magnetic tape management information superposed thereon, the signal has a duty ratio as altered from the usual duty ratio.

Based on the result of identifying the duty ratio by the CTL duty identification circuit 7, the system control circuit 8 decodes the tape management information superposed on the control signal and controls validation/invalidation of the command for signal recording according to the result of decoding. When the command is invalidated, information to this effect is presented on the display 12.

Alternatively when the command is validated, the system control circuit 8 closes the switch 3 for connection to the CTL signal recording circuit 5, prepares magnetic tape management information with reference to time information from the clock circuit 11, and gives a command for the CTL duty setting circuit 4 to alter the duty ratio for superposing the management information on the control signal.

In response to the command, the CTL duty setting circuit 4 prepares a control signal which has an altered duty ratio in accordance with the tape management information, feeding the signal to the CTL signal recording circuit 5. Consequently, the control signal is recorded on the control track of the tape 1 by the control head 2.

Figure 4:
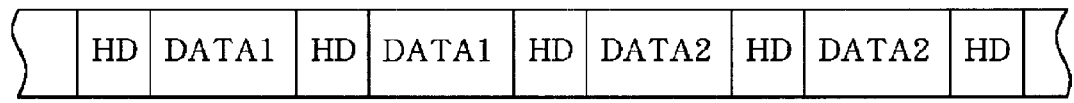
FIGS. 4(*a*) to 4(*e*) are diagrams for illustrating a format of magnetic tape management information.
Figure 4:
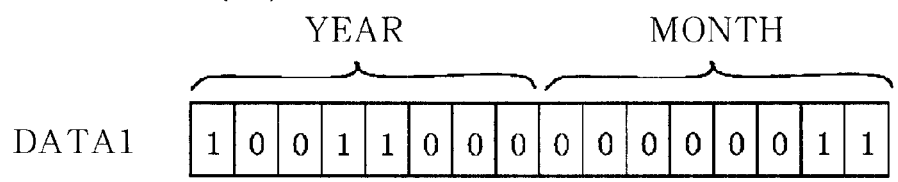
Figure 4:
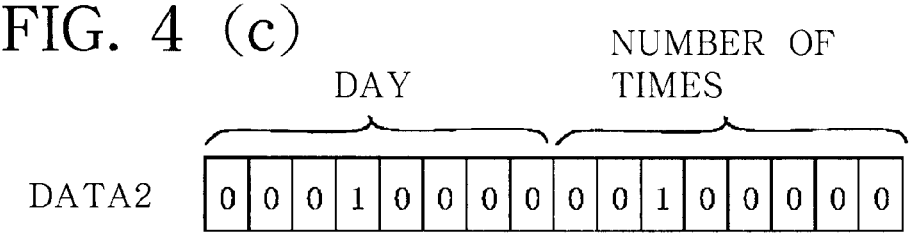
Figure 4:
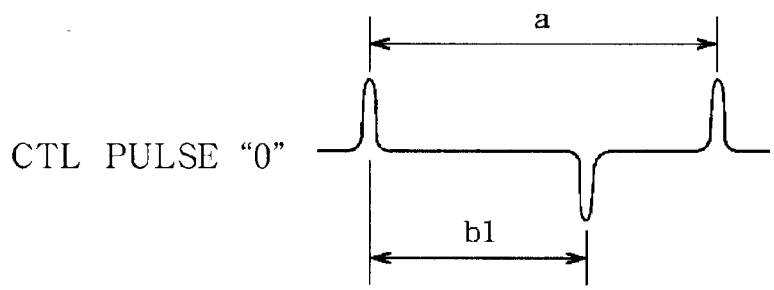
Figure 4:
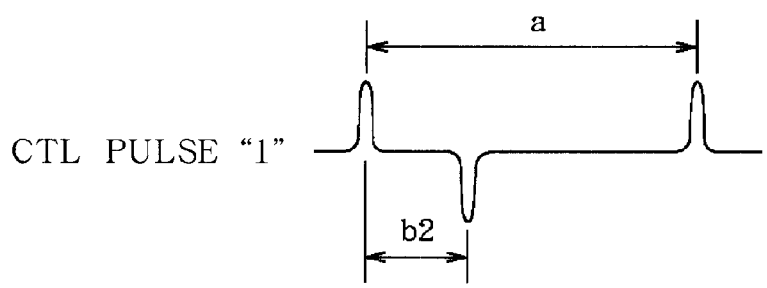

FIGS. 4(a) to 4(e) show an example of format for recording magnetic tape management information. As shown in FIG. 4(a), first data DATA1 and second data DATA2 representing the magnetic tape management information are written twice to the control track of the magnetic tape, subsequent to a header HD each time. As seen in FIG. 4(b), the first data DATA1 represents in 8 bits each of the year and month in which a recording was made. As shown in FIG. 4(c), the second data DATA2 represents in 8 bits each of the day when the recording was made and the number of times recording was made in the past.

With reference to FIGS. 4(d) and 4(e), the control signal is in the form of a train of CTL pulses comprising a rise peak and a fall peak in repetition. The rise peak period a serves the primary function of the control signal, i.e., the function of controlling the tape speed and phase. One of two different time intervals b between the rise peak and fall peak of CTL pulses is alternatively available, e.g., b1/a=0.6 or b2/a=0.3 in terms of duty ratio, such that the duty ratio of 0.6 represents the bit "0", and the duty ratio of 0.3 the bit "1".

The control signal having the tape management information superposed thereon can be recorded on the magnetic tape by two methods: one wherein the signal is recorded only on the starting portion of the tape which is initially wound up, and the other wherein the signal is recorded on the tape at a predetermined interval over the entire length thereof. The operation of the system control circuit 8 in the video recording mode is shown in FIG. 2 for practicing the former method, or in FIG. 3 for practicing the latter method.

Figure 2:
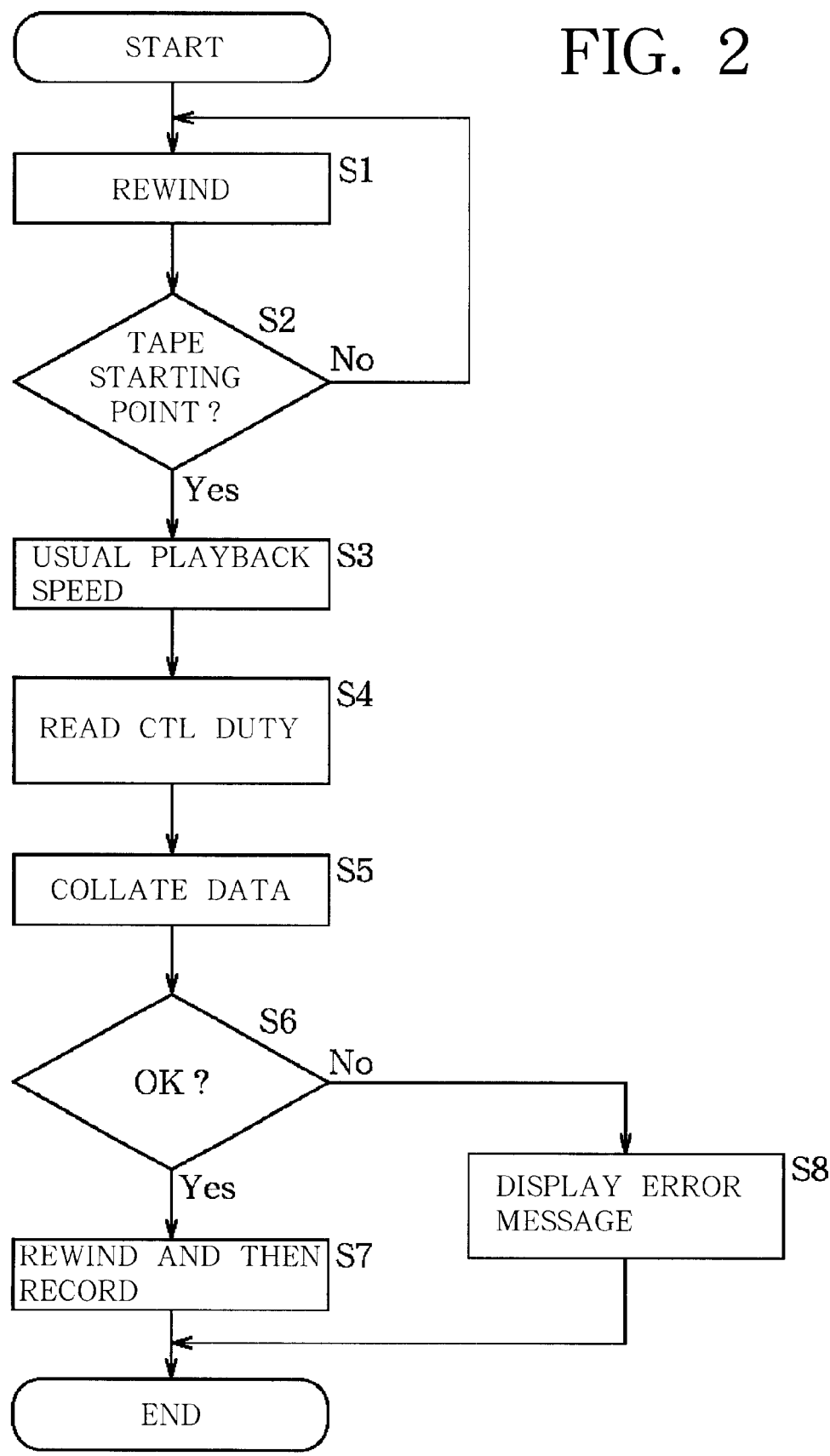
FIG. 2 is a flow chart showing an example of control operation to be performed by a system control circuit.

When a command for video recording is given by the manual key 13 concerned in the method of FIG. 2, a command to rewind the tape is given to the capstan motor control circuit 9 in FIG. 2, step S1, and an inquiry is made in step S2 as to whether the tape has been rewound to its starting point.

When the inquiry is answered in the affirmative, step S3 follows wherein a command is given for the capstan motor control circuit 9 to run the tape at the usual playback speed. The control signal reproduced from the tape is therefore fed to the CTL duty identification circuit 7 via the CTL signal reproduction circuit 6 and has its duty ratio identified. The result of duty ratio identification is sent to the system control circuit 8.

The circuit 8 in turn reads the result in FIG. 2, step S4, decoding the tape management information (the first data DATA1 and second data DATA2) superposed on the control signal.

Subsequently in step S5, the data representing the date of recording (day, month and year) found by decoding is collated with the current date obtained from the clock circuit 11, and the number of times recording was made (i.e., the frequency of recordings), as found by decoding is collated with a specified number of times. An inquiry is made in step S6 as to whether a specified period has elapsed and as to whether the frequency of recordings is in excess of the specified number of times. If the specified period has elapsed, with the frequency of recordings not in excess of the specified number of times, step S7 follows in which the tape is rewound to the starting point and then caused to travel forward, the current tape management information is written to the control track, and video signals are recorded.

On the other hand, if it is found in step S6 that the specified period has not elapsed or that the frequency of recordings is in excess of the specified number of times, step S8 follows in which an error message to this effect is presented on the display 12, and the command for recording is invalidated.

Figure 3:
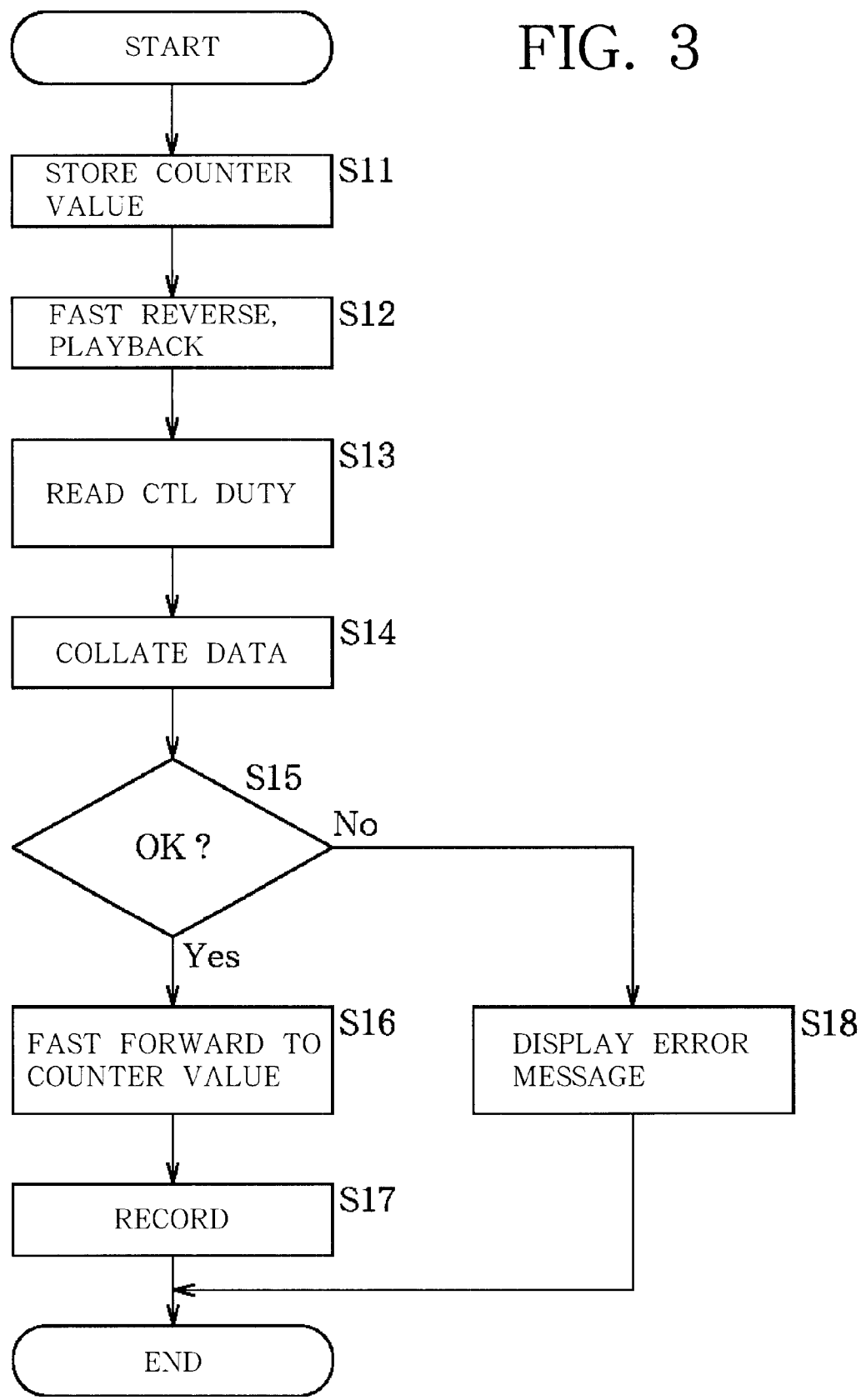
FIG. 3 is flow chart showing another example of control operation.

When a command for video recording is given by manipulating the manual key 13 concerned in the method of FIG. 3, the current value on the tape counter is read and stored in step S11 of FIG. 3. A command is thereafter given to the capstan motor control circuit 9 in step S12 for fast reverse and playback, whereupon the control signal reproduced from the tape is fed through the CTL signal reproduction circuit 6 to the CTL duty identification circuit 7, and the duty ratio of the control signal is identified. The result of identifying the ratio is sent to the system control circuit 8.

The circuit 8 in turn reads the result in step S13, decoding the tape management information (the first data DATA1 and second data DATA2) superposed on the control signal.

Subsequently in step S14, the data representing the date of recording (day, month and year) found by decoding is collated with the current date obtained from the clock circuit 11, and the number of times recording was made (i.e., the frequency of recordings) as found by decoding is collated with a specified number of times. An inquiry is made in step S15 as to whether a specified period has elapsed and as to whether the frequency of recordings is in excess of the specified number of times. If the specified period has elapsed, with the frequency of recordings not in excess of the specified number of times, step S16 follows in which the tape is forwarded fast to the counter value stored as mentioned above. The tape is thereafter run at the usual speed in step S17 to record video signals. In this step, tape management information is written to the control track of the tape at a specified interval.

On the other hand, if it is found in step S15 that the specified period has not elapsed or that the frequency of recordings is in excess of the specified number of times, step S18 follows in which an error message to this effect is presented on the display 12, and the command for recording is invalidated.

According to the method of FIG. 2, the latest or almost latest tape management information can be read from the tape at all times when the tape is rewound to its starting point. Alternatively with the method of FIG. 3, the latest tape management information is always available.

Since the validation/invalidation of the command for video recording is controlled with reference to the read tape management information, it is possible to reliably avoid the likelihood that video signals will be written anew over a magnetic tape which was used for recording and of which the specified preservation period has not elapsed, or the likelihood of recording video signals anew on an old magnetic tape of which the frequency of recordings has exceeded the specified number of time.

The CTL duty setting circuit 4, CTL signal recording circuit 5, CTL signal reproduction circuit 6 and CTL duty identification circuit 7 shown in FIG. 1 are incorporated also in conventional VCRs not having the functions of the invention but adapted, for example, to locate the start of a recorded sequence, while the control microcomputer constituting system control circuits is an essential component, so that the invention can be practiced merely by adding the function of FIG. 2 or 3 to a conventional computer program without necessitating an additional specific integrated circuit or the like.

The device of the invention is not limited to the foregoing embodiments in construction but can be modified variously without departing from the spirit of the invention as set forth in the appended claims. For example, the present invention can be embodied not only as time lapse VCRs but also as common home VCR cameras, etc.

What is claimed is:

1. A magnetic recording-reproduction device wherein a control signal is recorded on a control track of a magnetic tape to thereby control the tape speed and phase for the reproduction of video signals, the device comprising a CTL signal recording circuit for recording the control signal on the magnetic tape, a CTL duty setting circuit for setting a variable duty ratio for the control signal, a CTL signal reproduction circuit for reproducing the control signal recorded on the magnetic tape, a CTL duty identification circuit for identifying the duty ratio of the reproduced control signal, and a system control circuit for controlling the operation of the device, the system control circuit comprising:

first control means for decoding magnetic tape management information superposed on the control signal based on the result of identifying the duty ratio by the CTL duty identification circuit when a command is given to record video signals and controlling validation/invalidation of the command according to the result of decoding, and second control means for commanding the CTL duty setting circuit to vary the duty ratio to superpose magnetic tape management information on the control signal when video signals are to be recorded.

2. A magnetic recording-reproduction device according to claim 1 wherein the magnetic tape management information includes information as to the date of recording video signals on the magnetic tape, and the first control means of the system control circuit invalidates the command for recording when the decoded date indicates that a specified period has not elapsed.

3. A magnetic recording-reproduction device according to claim 1 wherein the magnetic tape management information includes information as to the number of times video signals were recorded on the magnetic tape, and the first control means of the system control circuit invalidates the command for recording when the decoded number of times is in excess of a specified number of times.

4. A magnetic recording-reproduction device according to claim 1 wherein the second control means of the system control circuit issues a command to give an altered duty ratio to the control signal to be recorded in the vicinity of a starting point of the magnetic tape.

5. A magnetic recording-reproduction device according to claim 1 wherein the second control means of the system control circuit issues a command to give an altered duty ratio to the control signal to be recorded over the entire length of the control track of the magnetic tape, at a predetermined interval along the control track.

* * * * *